US006323842B1

(12) United States Patent
Krukovsky

(10) Patent No.: US 6,323,842 B1
(45) Date of Patent: Nov. 27, 2001

(54) MOUSE WITH DISABLING DEVICE

(76) Inventor: Yuri Krukovsky, 43 St. Mark's Pl., #6D, New York City, NY (US) 10003

( * ) Notice: Subject to any disclaimer, the term of this patent is extended or adjusted under 35 U.S.C. 154(b) by 0 days.

(21) Appl. No.: 09/419,024

(22) Filed: Oct. 15, 1999

Related U.S. Application Data

(63) Continuation-in-part of application No. 09/410,180, filed on Sep. 30, 1999.

(51) Int. Cl.$^7$ ........................................................ G09G 5/08
(52) U.S. Cl. ................................................ 345/163; 345/156
(58) Field of Search ................................... 345/156, 157, 345/163, 164, 165, 166, 167, 168, 161

(56) References Cited

U.S. PATENT DOCUMENTS

| 3,541,541 | 11/1970 | Engelbart | 340/324 |
|---|---|---|---|
| 3,835,464 | 9/1974 | Rider | 178/18 |
| 4,816,810 | 3/1989 | Moore | 340/710 |
| 5,021,771 | * 6/1991 | Lachman | 345/164 |
| 5,256,913 | * 10/1993 | Sommer | 327/514 |
| 5,479,192 | * 12/1995 | Carroll, Jr. et al. | 345/168 |
| 5,585,823 | 12/1996 | Duchon | 345/163 |
| 5,642,805 | * 7/1997 | Tefft | 200/43.08 |
| 5,669,015 | * 9/1997 | Chidester et al. | 710/73 |
| 5,692,946 | 12/1997 | Rifkin | 463/37 |
| 5,838,306 | 11/1998 | O'Connor | 345/163 |
| 5,847,695 | 12/1998 | Duncan | 345/163 |
| 5,943,625 | 8/1999 | Yeom | 455/557 |

FOREIGN PATENT DOCUMENTS

401253023 * 10/1989 (JP).

* cited by examiner

Primary Examiner—Bipin Shalwala
Assistant Examiner—Ricardo Osorio
(74) Attorney, Agent, or Firm—Robert W. J. Usher

(57) ABSTRACT

A disabling device for a computer mouse allowing the operator to lock the pointer/cursor in the chosen spot on the screen and prevent any unintended and unpredictable input signals from the an idle computer mouse to the computer system, thereby ameliorating unnecessary movement of the mouse to reinstall the pointer/cursor in the proper position on the screen and to correct any possible wrong interaction with the computer before resuming the mouse operation again.

11 Claims, 2 Drawing Sheets

MOUSE WITH DISABLING DEVICE

RELATED APPLICATION

This is a continuation-in-part application of Ser. No. 09/410180, filed Sep. 30, 1999, the disclosure of which is incorporated herein by reference.

FIELD OF THE INVENTION

The invention relates to computer system interfaces and particularly to computer mice.

BACKGROUND OF THE INVENTION

A computer mouse is used as a manual input device for generating signals corresponding to a position of a pointer/cursor on a screen enabling an operator to input a signal at any desired location. Many millions of such mice have been in widespread use worldwide for many years and numerous models of computer mice with enhanced operational abilities are currently available on the market.

All computer system interfaces are designed to be heavily protected from the interference of any undesired external signal; the only interface left exposed to such interference is the computer mouse interface when the mouse is idle on the usually crowded desk. In this situation, unless the interface is disabled, any unintended incorrect movement and unintentional click of the mouse can have dire consequences especially in business areas such as finance or stock trading. Furthermore, many on-line day traders and others work from home with young children around which can exacerbate the same problem on an everyday basis. Additionally, such unpredictable interactions often remain unnoticed when later resuming mouse operations, precluding timely correction with unexpected, later manifested affects on applications or settings.

At least, when returning to the computer, it is a common experience for a computer user to need to make a few additional corrective mouse movements to find or relocate the cursor/pointer to the correct location and to reverse unwanted computer inputs.

U.S. Pat. No. 4,816,810 issued Mar. 28, 1989 to Robert F. Moor teaches the provision of a separate acceptance switch spaced apart from but electrically connected to the mouse to prevent any inadvertent movement of the mouse and thereby the mouse cursor as a direct result of pressing the mouse button. The mouse is used to draw fine details of a graphic display.

However, neither that patent nor any other known devices include a feature which can permit the operator to exclude or block any unintended, unpredictable input signal, which could otherwise result in such undesired actions as document delete, application close, document copy or move to an incorrect folder.

SUMMARY OF THE INVENTION

An object of the present invention is to provide a disabling device for the computer mouse, which can prevent unintended and unpredictable input signals from the idle computer mouse to the computer system causing undesirable interaction with the applications or settings of the computer.

Another object of the present invention is to provide a disabling device for the computer mouse, which can obviate the need to return the pointer/cursor to the correct position on the screen before resuming mouse operation.

A further object of the present invention is to provide the computer mouse with a disabling device, which is protected from risk of unintended activation preventing accidental pointer lock during normal mouse operation.

A still further object of the present invention is to provide a disabling device for the computer mouse, which could be universally utilized in any mouse of any computer system.

Yet another object of the present invention is to provide a disabling device for the computer mouse, which is inexpensive and easily incorporated in a computer mouse of conventional design with only minimal modification.

According to the present invention, there is provided a disabling device for a computer mouse allowing the operator to lock the pointer/cursor in the chosen spot on the screen and prevent any unintended and unpredictable input signals from an idle computer mouse to the computer system thereby ameliorating unnecessary movement of the mouse to reinstall the pointer/cursor in the proper position on the screen and to correct any possible wrong interaction with the computer before resuming the mouse operation again.

In the preferred embodiment of the invention an operating button of the disabling device can be located near the center of the upper surface of the mouse housing protected from inadvertent activation by recessing in a concavity formed in the housing thereby preventing accidental locking of the pointer/cursor during normal mouse operation.

The disabling device of the invention may be a simple miniature switch disabling only the part of the electrical circuitry of the mouse which generates X-Y positioning signals and acceptance signals. The switch is inexpensive and can be easily incorporated within a minimally modified conventional mouse housing as a small addition.

BRIEF DESCRIPTION THE DRAWINGS

In order that the invention may be readily understood, a specific embodiment thereof will now be described by way of example only with reference to the accompanying drawings in which.

DESCRIPTION OF THE PREFERRED EMBODIMENT

Figure 1A:
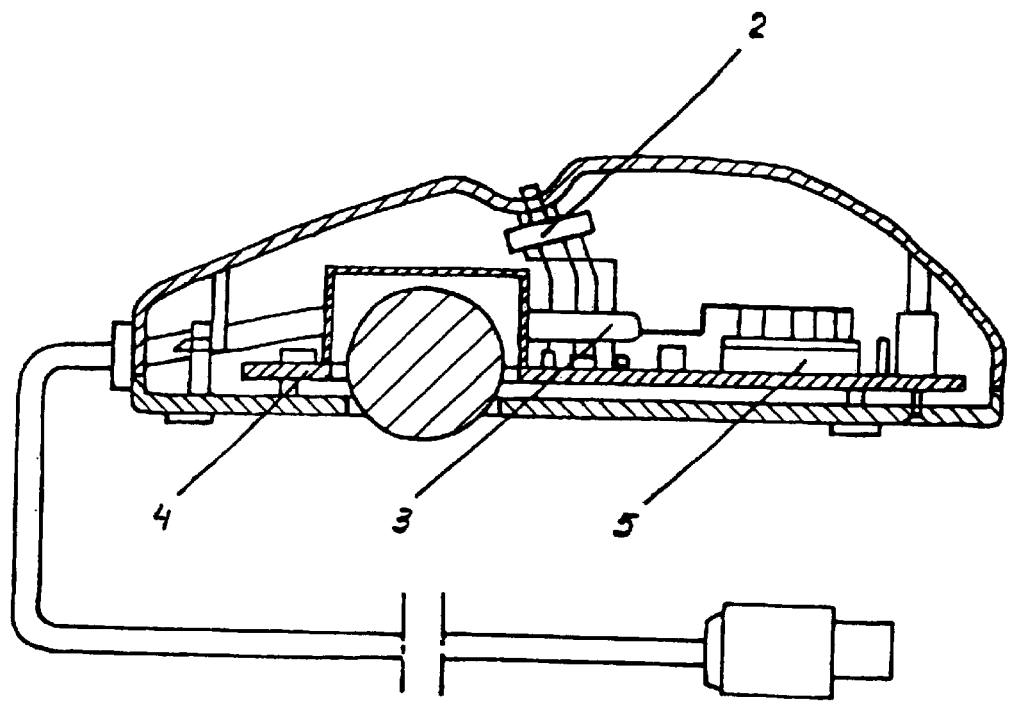
FIGS. 1a–1b, are, respectively, a cross section of the preferred embodiment of the mouse with the disabling device incorporated within the mouse housing and a plan view of the mouse with a disabling switch mounted thereon.
Figure 1B:
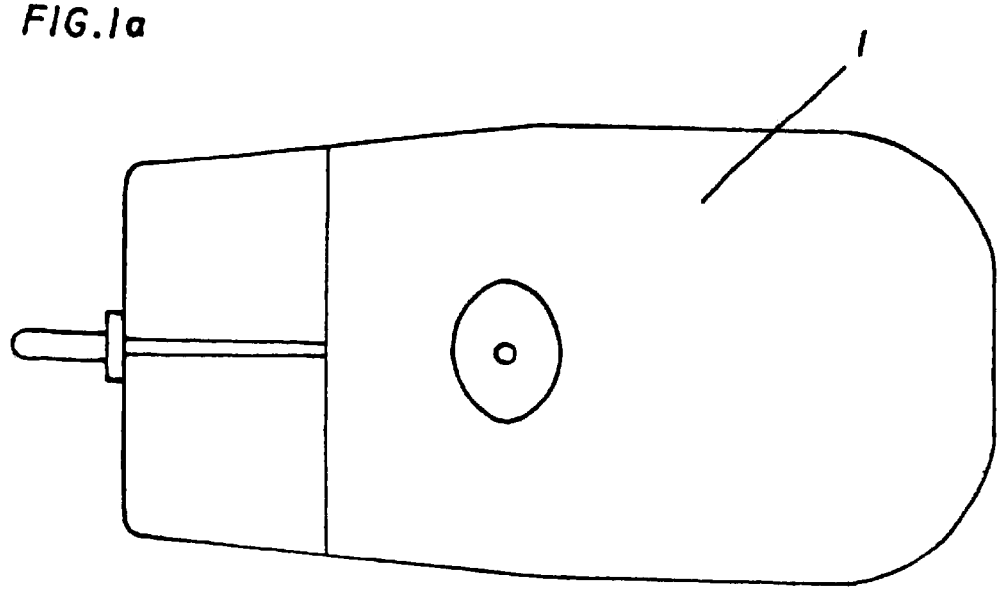

As shown in FIG. 1a–1b, the disabling device 2 in the mouse 1 of the preferred embodiment of the present invention is a switch of conventional design incorporated within the mouse housing, mounted under the upper cover which is formed with a concavity or recess into which an operating button of the switch protrudes protected from inadvertent activation by the user's mouse operating hand. The electrical circuitry of the mouse is connected to a computer system through a flexible electrical cable 3 which conducts the data signals and power supply to the mouse circuitry and has an input end plugged into a socket 5 on a printed circuit board 4 which are of conventional design.

Figure 2:
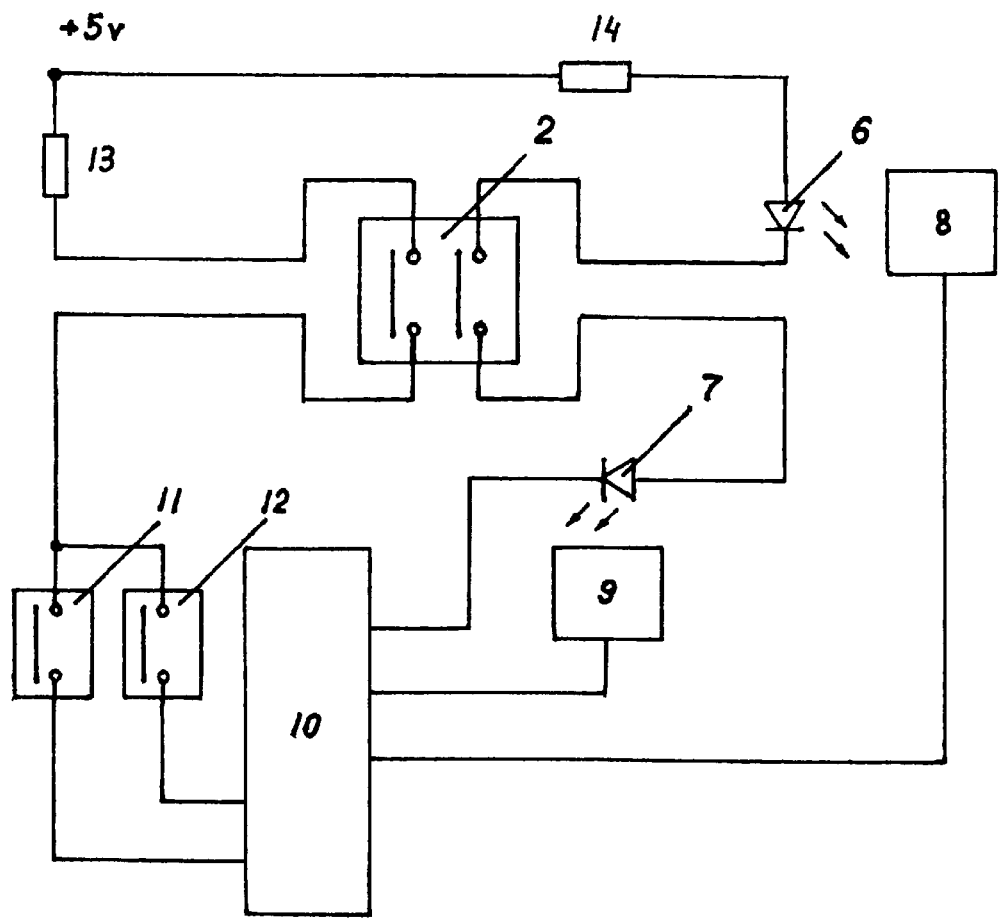
FIG. 2 is a block/schematic diagram of the disabling device of the present invention connected to the components of the mouse circuitry, which are common for all modifications of an electrical circuitry of opto-mechanical mouses.

In practice, as shown in FIG. 2, the disabling device 2 is connected to the circuit of two LEDs 6, 7 and resistor 14, which are a source of X-Y position signals fed to signal processor 10 by two photo transistors 8, 9 of the operating circuitry of the mouse. The device 2 is also coupled between the junction of two acceptance buttons 11, 12 and the resistor 13 connected to the source of voltage from operating circuitry of the mouse.

Such electrical circuit components as LEDs 6, 7, acceptance buttons 11, 12 and their internal connection with operating circuitry of the mouse are common for all types of computer mouses.

Thus, when the switch 2 is in the "on" position, the user can operate the mouse in the regular way and the switch will not affect any operational feature of the mouse.

When the user has finished the task and is prepared to release the mouse he simply pushes the switch 2 into the "off" position using his mouse operating hand, interrupting current flow through resistor 14 and LEDs 6, 7. At the same time the voltage supply to acceptance buttons 11, 12 is also cut off. In this case, the source of X-Y position signals is disabled and the mouse will not transmit any signal to the computer system, thereby effectively locking the pointer/cursor at the chosen spot on the screen.

In the "off" position, the mouse-computer interface is totally protected. No amount of movement of the mouse or button pressing can generate any input signal for the computer system, ensuring that the user can later resume the mouse operation with the pointer/cursor at the exact spot on the screen where it had been previously locked.

When switch 2 is in the "off" position and positioning interaction between the mouse and the computer is blocked, it nevertheless will not affect the detection of the mouse by the computer at computer start-up. This is because the absence of X-Y position signals from LEDs 6, 7 and acceptance signals from buttons 11, 12 actually simulates the resting (inactive) condition of a regular mouse and therefore none of the operational characteristics of the mouse with the disabling device will be altered because the electrical circuit of the mouse is still fully operational.

To make the computer mouse interface even more secure the disabling device 2 can be a double-click activated switch.

The concave cavity on the upper cover of the mouse is strategically located in the middle near the top of the cover providing easy operator access to the switch 2 but, at the same time, not being susceptible to accidental activation by the user's hand. The optimal position of the cavity would be at a location of the mouse housing underlying the area of the end of the first phalange of the middle finger of the computer user.

Positioning the switch thus enables operation of the switch without requirement for additional movement of the hand relative to the mouse. The operator simply bends his middle finger to push the switch button disabling the mouse.

The provision of the disabling device improves the efficiency and reliability of the computer operation in providing a simple solution for a longstanding and well-recognized problem.

The device is universal and can be utilized in any mouse of any computer system.

I claim:

1. A computer mouse comprising a housing separate from a keyboard enclosing operating circuitry for control of a mouse cursor function and a selection button function for interaction with a computer system via an electrical connector and comprising a disabling device for preventing at least one function interaction between the mouse and the computer system without a requirement for a prior authorization signal from the computer, the disabling device comprising switching means incorporated as an internal part of the operating circuitry for reversibly disabling one of the cursor function and the selection button function without affecting continuous communication between the mouse and the computer system necessary for mouse detection by the computer system, the switching means having an actuating component internally connected to the operating circuitry of the computer mouse and operable by a mouse operating hand of the user to reversibly disable the interaction thereby preventing an unintended input signal from the mouse to the computer system.

2. A disabling device according to claim 1, wherein the housing has an external surface portion formed with a recss and the actuating component has an actuating portion extending through the housing into the recess thereby protected from inadvertent activation by the user's hand while operating.

3. A disabling device according to claim 1, wherein the switching means operable by the mouse operating hand of the user is internally connected to a circuit of a source of X-Y positioning signals of the operating circuitry of the mouse for reversibly disabling generation of said signals.

4. A disabling device according to claim 1, wherein the switching means operable by the mouse operating hand of the user is internally connected to a circuit of an acceptance button and between a source of voltage from the operating circuitry and a signal processor of the computer mouse for reversibly disabling generation of an acceptance signal from the mouse.

5. A disabling device according to claim 3, wherein the switching means operable by the mouse operating hand of the user is internally connected to the circuit of two LEDs of the source of the X-Y positioning signals of the operating circuitry of the mouse for disabling generation of said signals.

6. A disabling device according to claim 2, wherein said actuating component is a button.

7. A disabling device according to claim 2, wherein the switching means is connected to a source of X-Y positioning signals of the operating circuitry for reversibly interrupting generation of said signals.

8. A disabling device according to claim 2, wherein the switching means is coupled between an acceptance button and a source of voltage from the operating circuitry for reversibly interrupting voltage supply to said acceptance button.

9. A disabling device according to claim 7, wherein the switching means is coupled in series between two LED's of the source of the X-Y positioning signals of the operating circuitry for reversibly interrupting electric current flow through said LED's.

10. A disabling device according to claim 3, wherein the switching means operable by the mouse operating hand of the user is internally connected to a circuit of an acceptance button and between a source of voltage from the operating circuitry and a signal processor of the computer mouse for reversibly disabling generation of an acceptance signal from the mouse.

11. A disabling device according to claim 5, wherein the switching means operable by the mouse operating hand of the user is internally connected to a circuit of an acceptance button and between a source of voltage from the operating circuitry and a signal processor of the computer mouse for reversibly disabling generation of an acceptance signal from the mouse.

* * * * *